(12) United States Patent
Wipasuramonton et al.

(10) Patent No.: US 6,279,944 B1
(45) Date of Patent: *Aug. 28, 2001

(54) AIR BAG WITH DIVERTER AND EXPANDED VOLUME CHAMBER

(75) Inventors: Pongdet P. Wipasuramonton, Rochester; Bruce A. Kalandek, Dearborn; Robert Tobian, New Baltimore; Brian J. Bailey, Sterling Heights; Michael R. Dillon, Clarkston; Shakir M. Salmo, Madison Heights, all of MI (US); Peter Priemer, Friedrichadorf (DE); Stefan Jost; Markus Jost, both of Wiesbaden (DE)

(73) Assignee: Breed Automotive Technology, Inc., Lakeland, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,015

(22) Filed: Oct. 6, 1998

(51) Int. Cl.[7] ............................. B60R 21/22
(52) U.S. Cl. ............... 280/730.2; 280/729; 280/740
(58) Field of Search .................... 280/740, 729, 280/730.2, 743.1

(56) References Cited

U.S. PATENT DOCUMENTS

| | | | |
|---|---|---|---|
| 3,618,981 | * 11/1971 | Leising et al. | 280/740 |
| 3,799,575 | * 3/1974 | Kurze et al. | 138/41 |
| 3,836,169 | * 9/1974 | Schiesterl | 280/731 |
| 4,265,468 | * 5/1981 | Suszko et al. | 280/729 |
| 4,290,627 | * 9/1981 | Cumming et al. | 280/729 |
| 5,172,933 | * 12/1992 | Strasser | 280/740 |
| 5,573,270 | * 11/1996 | Sogi et al. | 280/740 |
| 5,586,782 | * 12/1996 | Zimmerman, II et al. | 280/730.2 |
| 5,632,506 | * 5/1997 | Shellabarger | 280/743.1 |
| 5,791,685 | * 8/1998 | Lachat et al. | 280/743.1 |
| 5,848,804 | 12/1998 | White, Jr. et al. . | |
| 5,853,191 | * 12/1998 | Lachat | 280/730.2 |
| 5,895,070 | * 4/1999 | Crimmins et al. | 280/730.2 |
| 5,899,490 | * 5/1999 | Wipasuramonton et al. | 280/730.2 |
| 5,918,902 | * 7/1999 | Acker et al. | 280/743.1 |
| 5,944,342 | 8/1999 | White, Jr. et al. . | |

\* cited by examiner

Primary Examiner—Paul N. Dickson
(74) Attorney, Agent, or Firm—Markell Seitzman

(57) ABSTRACT

An air bag for side impact protection system comprising: an air bag (50) having an inflatable first chamber (50a) formed of two joined-together first (52a) and second (52b) panels of material, the first chamber including a forward part (26) and an opposite rear part (60); an inflator (26) for generating inflation gas to inflate the air bag, the inflator including exit ports (26a) which channel the inflation gas into the first chamber in a determinable direction; the air bag further including a flow diverter (70, 90) positioned to receive inflation gas and to divert at least a component of the inflation gas to flow generally perpendicular to the first direction. In one embodiment the flow diverter is formed as an open topped tube; in another embodiment; the flow diverter includes a plurality of vent openings in the side of the tube. In a third embodiment of the invention the diverter is formed by a permeable sack of material. In another embodiment of the invention the rear of each of the first and second panels includes a curved portion which is separated by a curved separator panel to form a pressure accumulator.

20 Claims, 14 Drawing Sheets

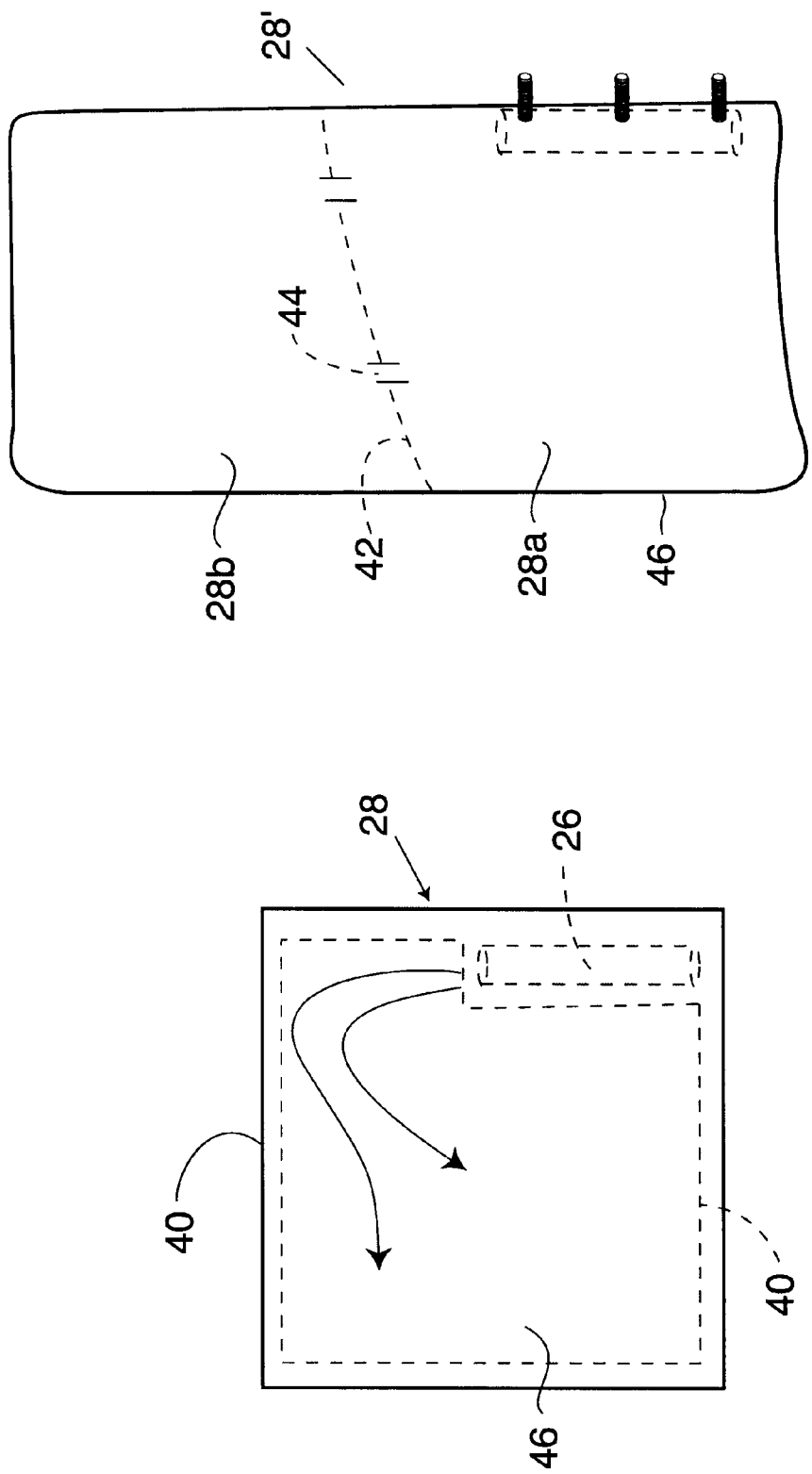

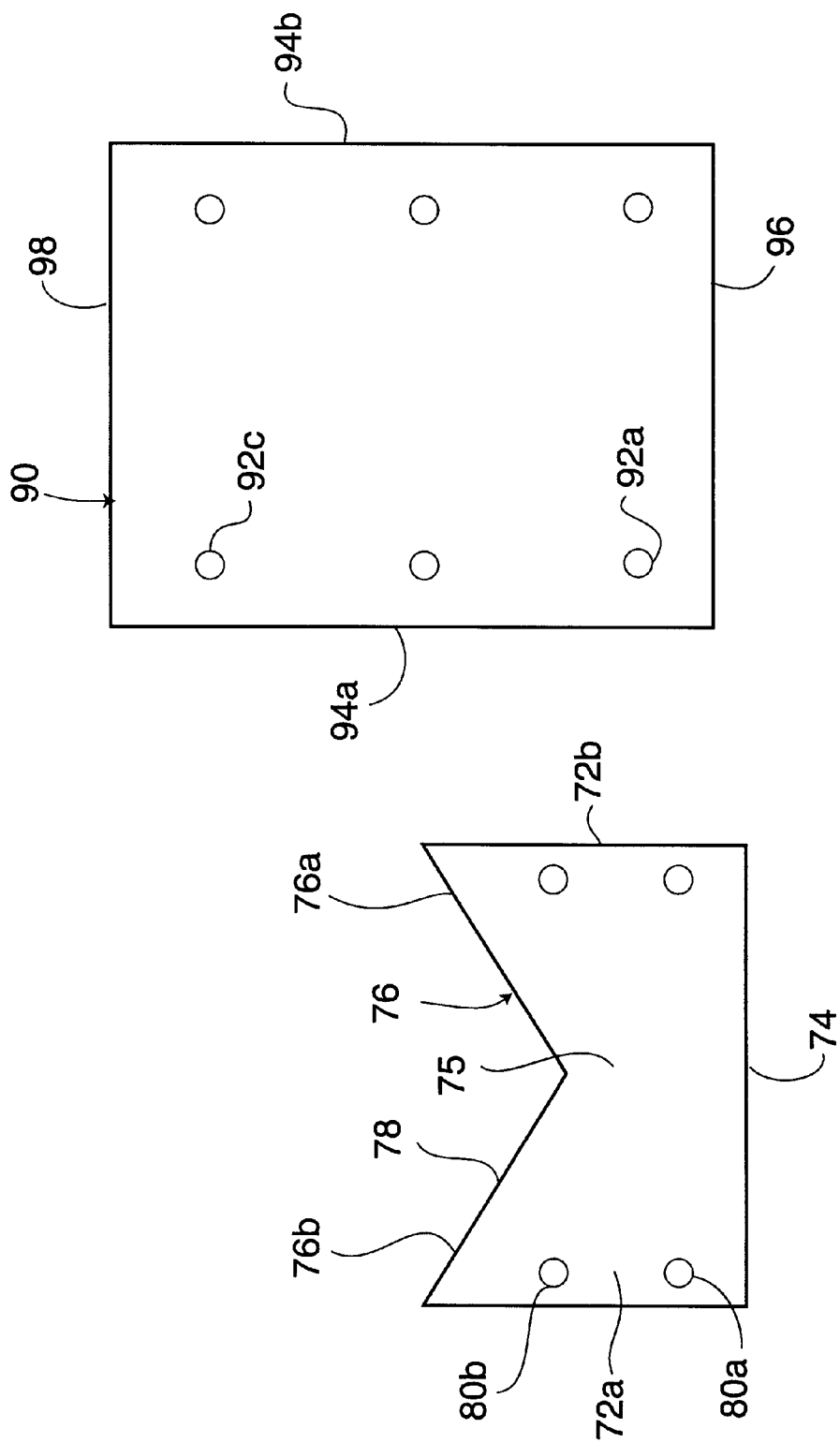

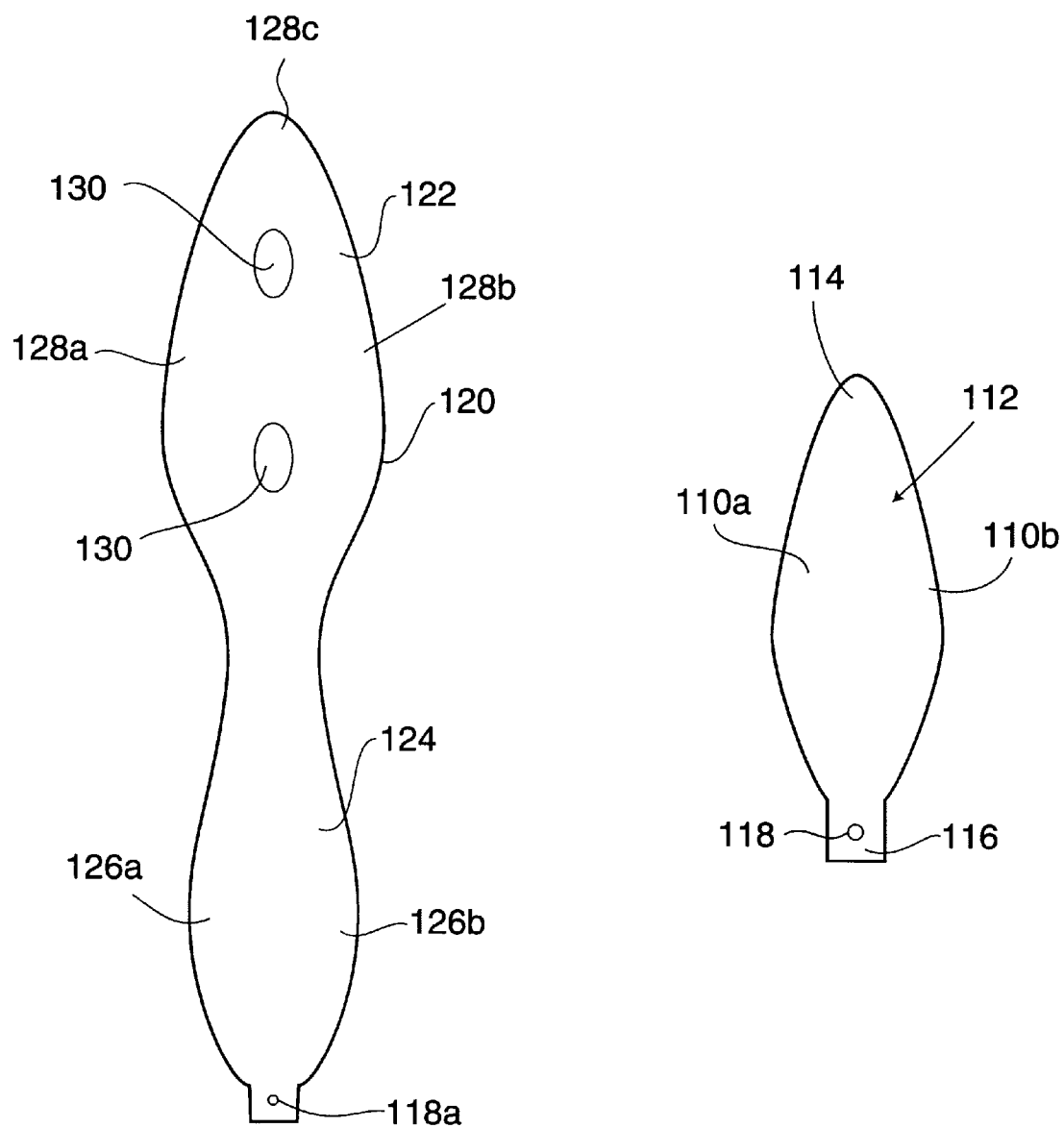
Fig. 3e  Fig. 3f

AIR BAG WITH DIVERTER AND EXPANDED VOLUME CHAMBER

BACKGROUND AND SUMMARY OF THE INVENTION

The invention generally relates to air bag systems and more particularly to a side impact or rollover air bag system located in an outboard portion of a vehicle seat.

The prior art is replete with air bag systems to protect one or more occupants in a side impact and/or rollover event. These systems require that the air bag be mounted in or on a door adjacent to a vehicle seat, or on the vehicle seat. FIG. 1 schematically illustrates an air bag safety system 20 mounted in an outboard portion 22 of a vehicle seat 24 adjacent a side of the vehicle. The system 20 comprises an inflator 26 and an expandable air bag 28. Upon activation of the inflator, inflation gasses are produced causing the air bag 28 to tear open a seam 29 in the seat or open a movable door (not shown), also in the seat. Upon inflation, the air bag is positioned between an occupant, generally shown by phantom line 30, and the side 32 of the vehicle. As illustrated in FIG. 1, the air bag 28 is relatively small and is designed to protect the torso area of an adult. Air bags may also include an upper appendage or second chamber generally shown by phantom line 28', which is illustrative of a head chamber of a larger air bag.

As can be seen from FIG. 1, the occupant 30 is shown relatively small and the head 36 of the occupant is positioned adjacent the torso portion or lower chamber of the air bag. This orientation is illustrative of one of the out-of-position (OOP) seating conditions of the occupant that might exist in a vehicle. As an example, the occupant 30 can be thought of as a small child, having his or her head cradled in the void between the outward side portion 22 of the seat and the vehicle side 32. Upon inflation of the air bag 28, the occupant's head 36 or other portions of the occupant's body may be unfavorably interfered with by the inflating air bag 28.

Reference is made to FIGS. 2A and 2B which diagrammatically illustrate two air bags 28 and 28'. Air bag 28 is typically manufactured utilizing two generally identical panels of woven material which are sewn about a peripheral edge shown as 40. The air bag includes means, such as an opening, for receiving the inflator 26 therein. FIG. 2B illustrates the enlarged air bag 28' having a lower or torso chamber 28a and an upper or head chamber 28b. These chambers are separated by a separator panel or line of stitches generally shown as 42 which includes a plurality of vent openings 44 to allow the migration of the inflation gas from the lower chamber to the upper chamber.

Consider the operation of the air bags shown in FIGS. 2A and 2B in conjunction with the construction of the vehicle shown in FIG. 1. As is known, the crush zone between the side of the vehicle 32 and the occupant 30 is relatively small in relationship to a side impact collision. Consequently, to protect the occupant from injury during this type of event, the inflator must relatively quickly (within 8–10 milliseconds) inflate the air bag and cause same to be repositioned between the occupant and the vehicle side. To achieve the repositioning of the air bag in the required timeframe requires that the inflator be rather aggressive, that is, it is capable of producing a significant amount of inflation gas within a few milliseconds. As the inflator 26 produces the gasses, experience has shown that air bags constructed similar to those shown in FIGS. 2A and 2B push the forward edge 46 of the torso chamber outwardly extremely quickly.

Of course, prior to being inflated the air bag 28 is maintained in a compact folded orientation within a pocket located within the upholstered side or side wing of the vehicle seat. If the occupant 30 is in an out-of-position orientation, this type of deployment of the air bag may induce certain occupant injuries.

It is an object of the present invention to provide an air bag which controls the pressure gradients generated within the torso or lower chamber of the air bag to lessen out-of-position-induced occupant injury. Accordingly the invention comprises: An air bag system for side impact protection comprising: an air bag (50) having an inflatable first chamber (50a) formed of two joined-together first: (52a) and second (52b) panels of material, the first chamber including a forward part (26) and an opposite rear part (60); an inflator (26) for generating inflation gas to inflate the air bag, the inflator including exit ports (26a) which channel the inflation gas into the first chamber in a determinable direction; the air bag further including a flow diverter (70, 90) positioned to receive inflation gas and to divert at least a component of the inflation gas to flow generally perpendicular to the first direction. In one embodiment the flow diverter is formed as an open-topped tube; in another embodiment the flow diverter includes a plurality of vent openings in the side of the tube. In a third embodiment of the invention the diverter is formed by a permeable sack of material. In another embodiment of the invention the rear of each of the first and second panels includes a curved portion which is separated by a curved separator panel to form a pressure accumulator.

Many other objects and purposes of the invention will be clear from the following detailed description of the drawings.

BRIEF DESCRIPTION OF THE DRAWINGS

In the drawings:

FIGS. 2A and 2B diagrammatically illustrate prior art torso and side impact air bags.

FIGS. 3A–3F show the various parts of an air bag.

DETAILED DESCRIPTION OF THE DRAWINGS

Figure 9:
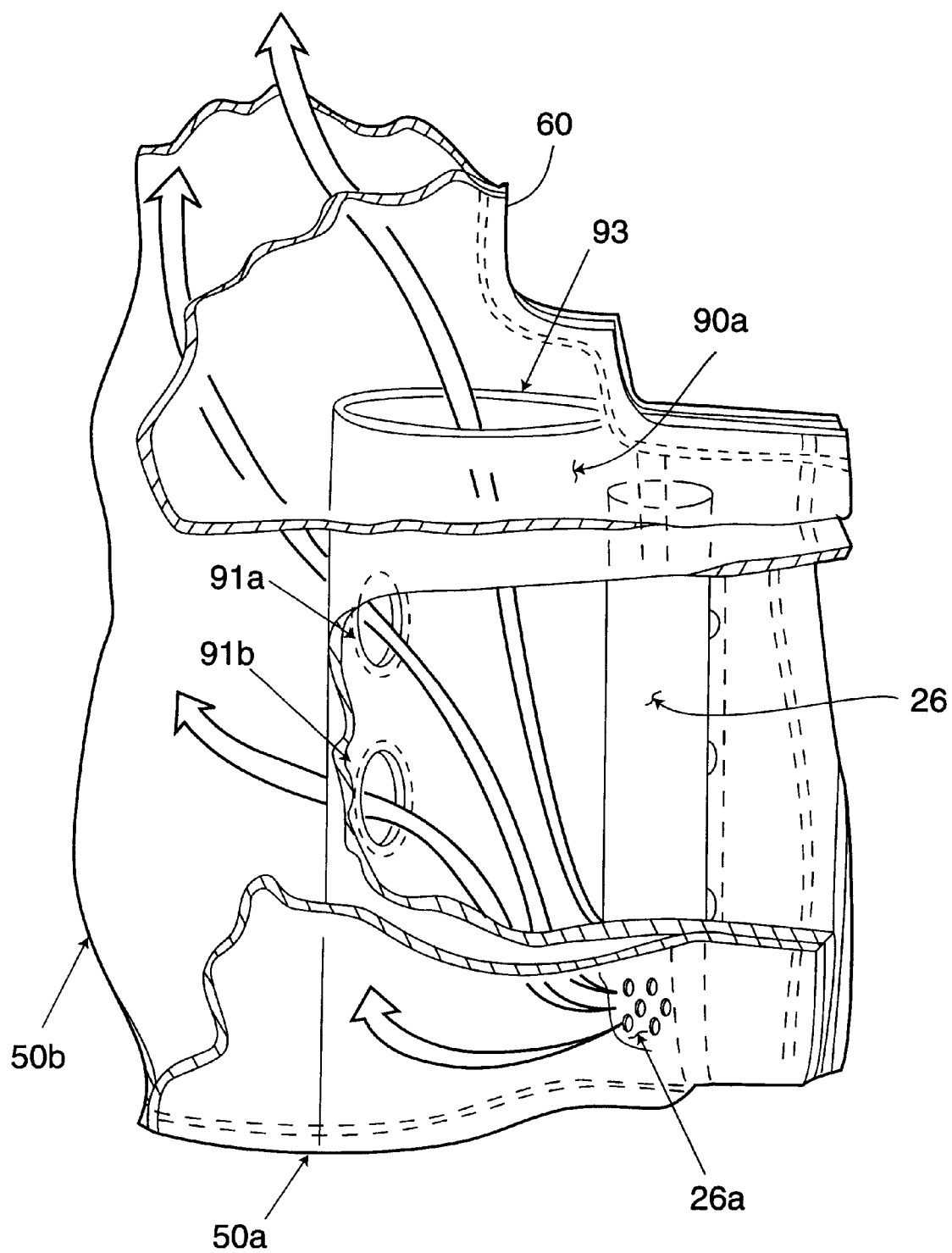
FIGS. 9 and 10 show alternate embodiments of the invention.
Figure 10:
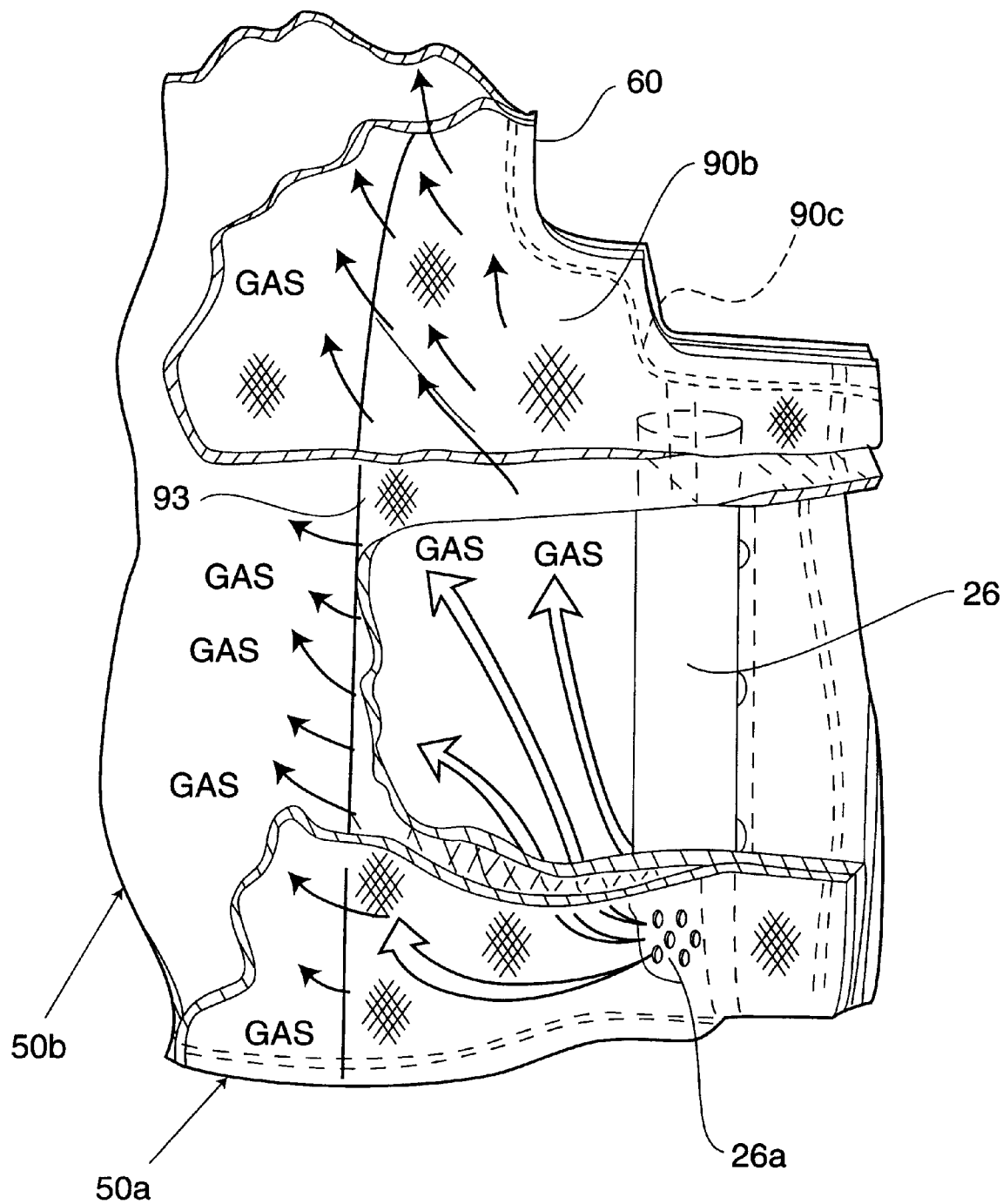
Figure 11:
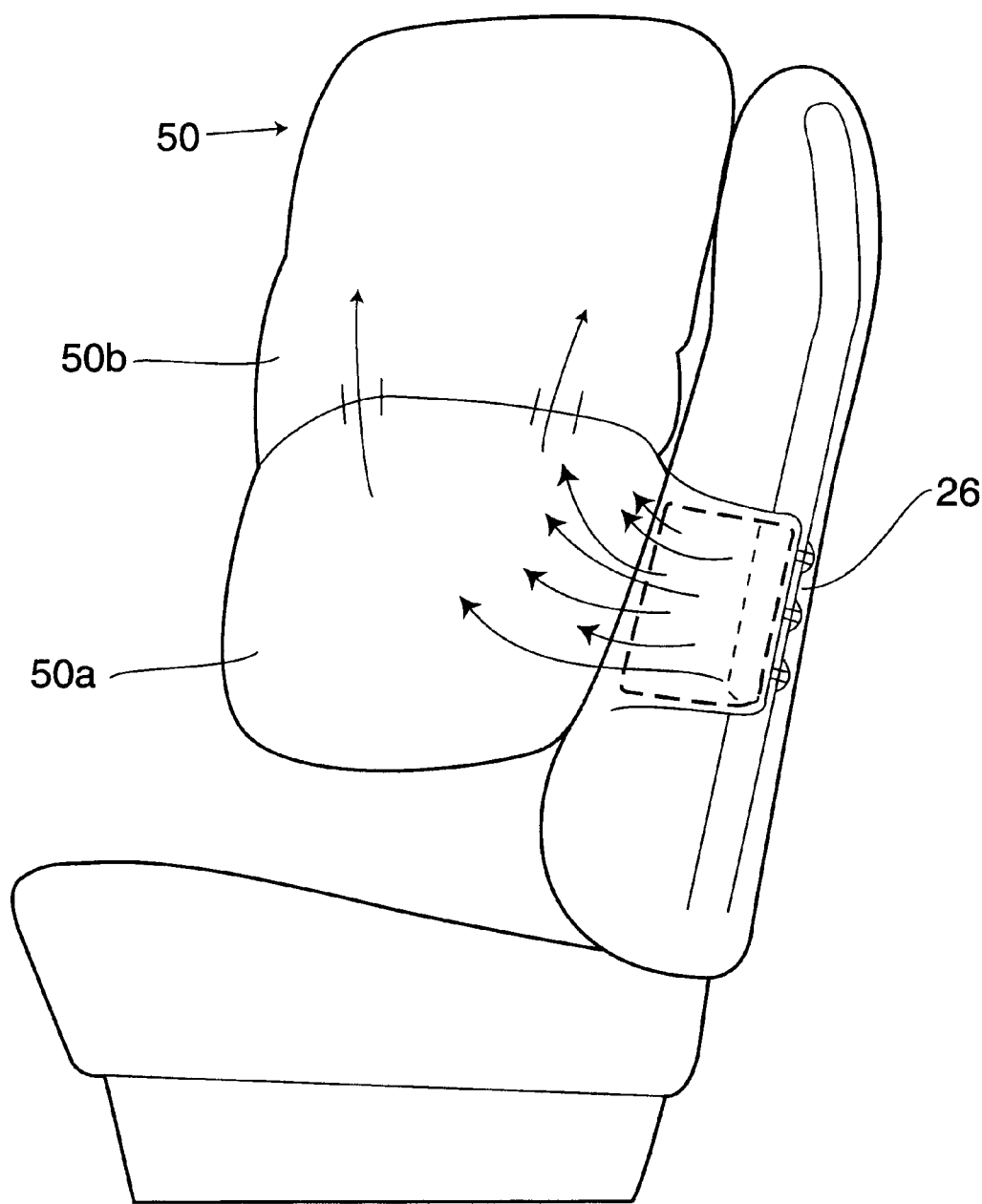
FIG. 11 is a side view of a. vehicle seat with an air bag deploying therefrom.

Reference is now made to FIGS. 3A–3F and FIG. 4. The air bag 50 of the present invention comprises a first panel 52a and a second panel 52b. These panels 52a and 52b are substantially identical and can be made of woven air bag material that may be coated (with silicon or the like) or uncoated. The various panels can also be made of a plastic film. If a permeable woven material is used the inside surfaces of each panel may be covered with silicon or other coating to reduce its permeability. Each panel includes a front first side 54, a top 56 and bottom 58. Additionally, each panel includes an opposing rear second side 60. In the embodiment shown in FIGS. 3A–3F and FIG. 4, the second side 60 is not straight. This second side 60 may include a generally top first straight portion 60a, a lower second straight portion 60b and an arcuate portion 60c therebetween. FIGS. 9 and 10 show an alternate air bag 50' having a generally straight rear second side. A plurality (such as three) of mounting holes 62a–62c are positioned near in the lower corner (adjacent the lower straight portion 60b) of each panel 52a and 52b.

Figure 1:
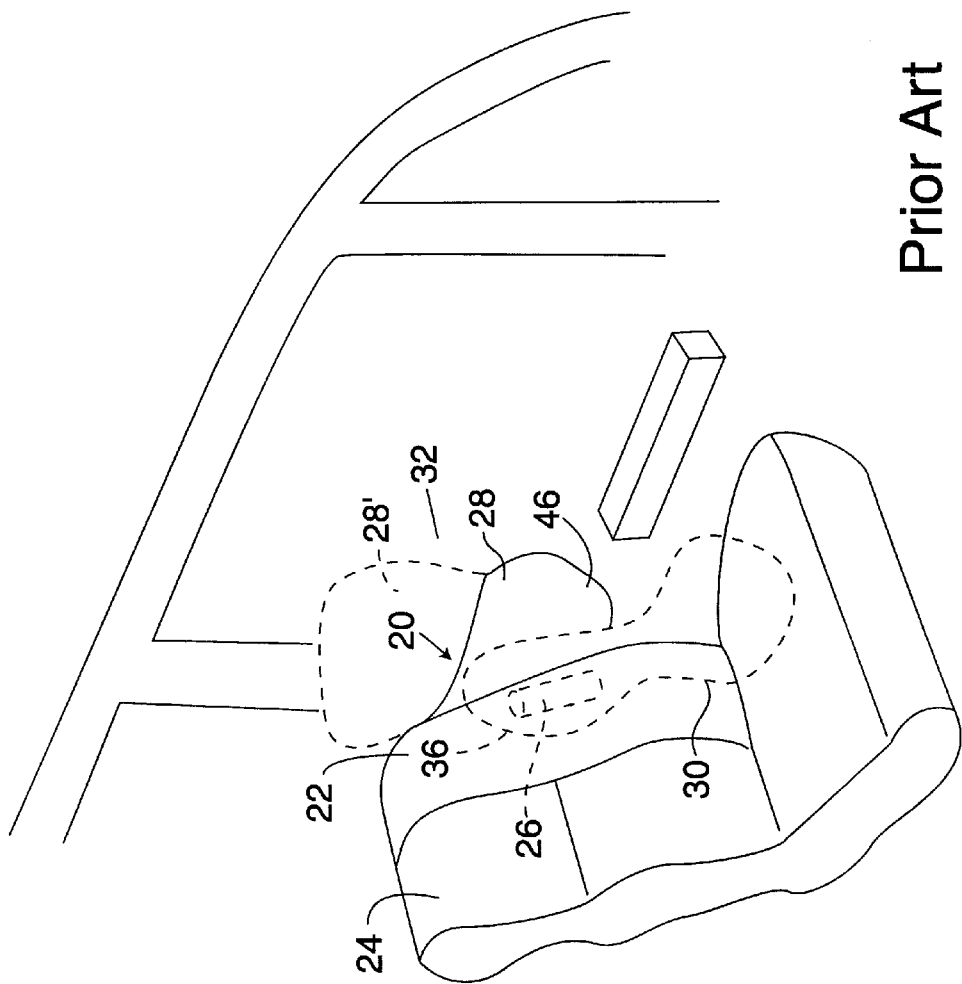
FIG. 1 is illustrative of a prior art side impact air bag system.
Figure 3B:
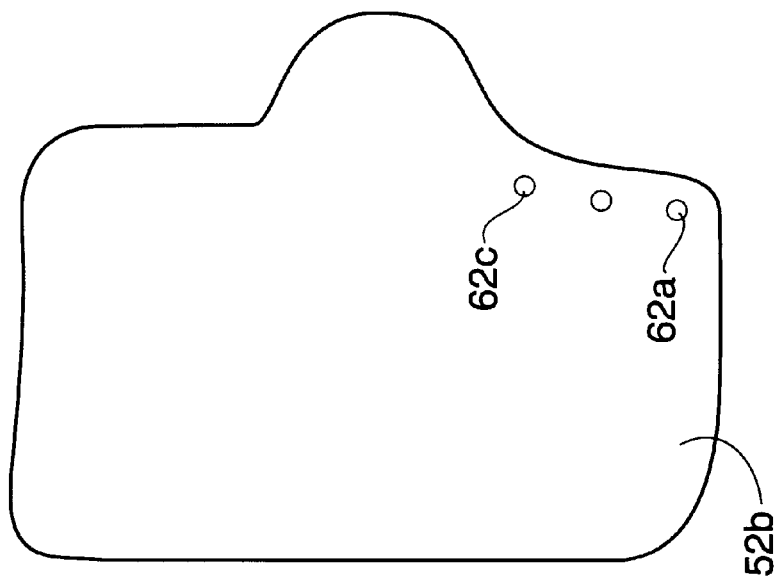
Figure 3A:
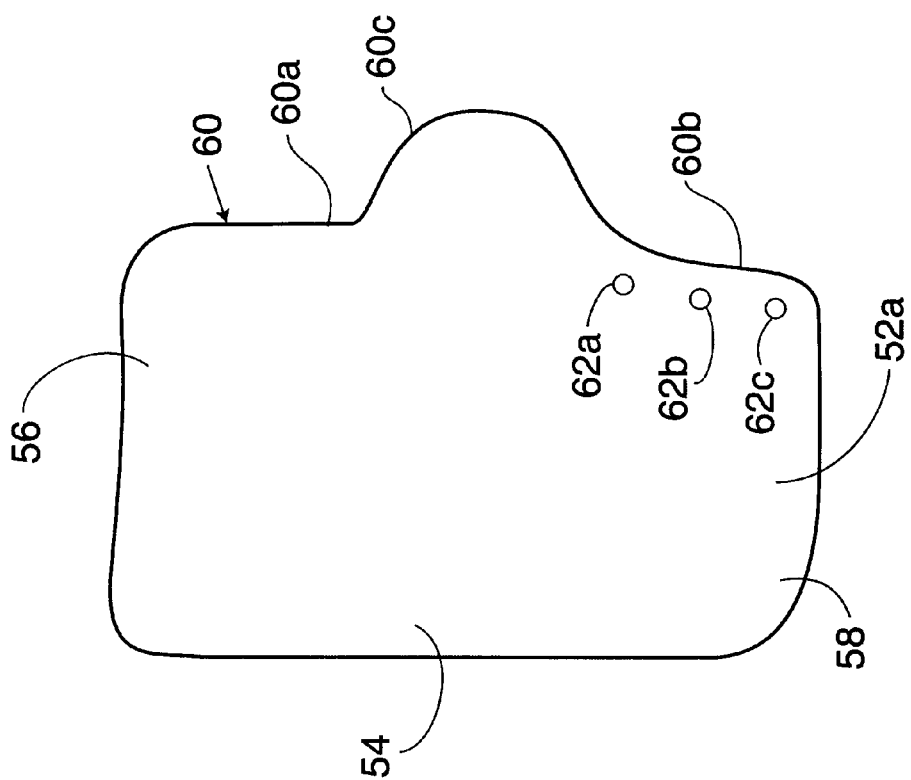
Figure 4:
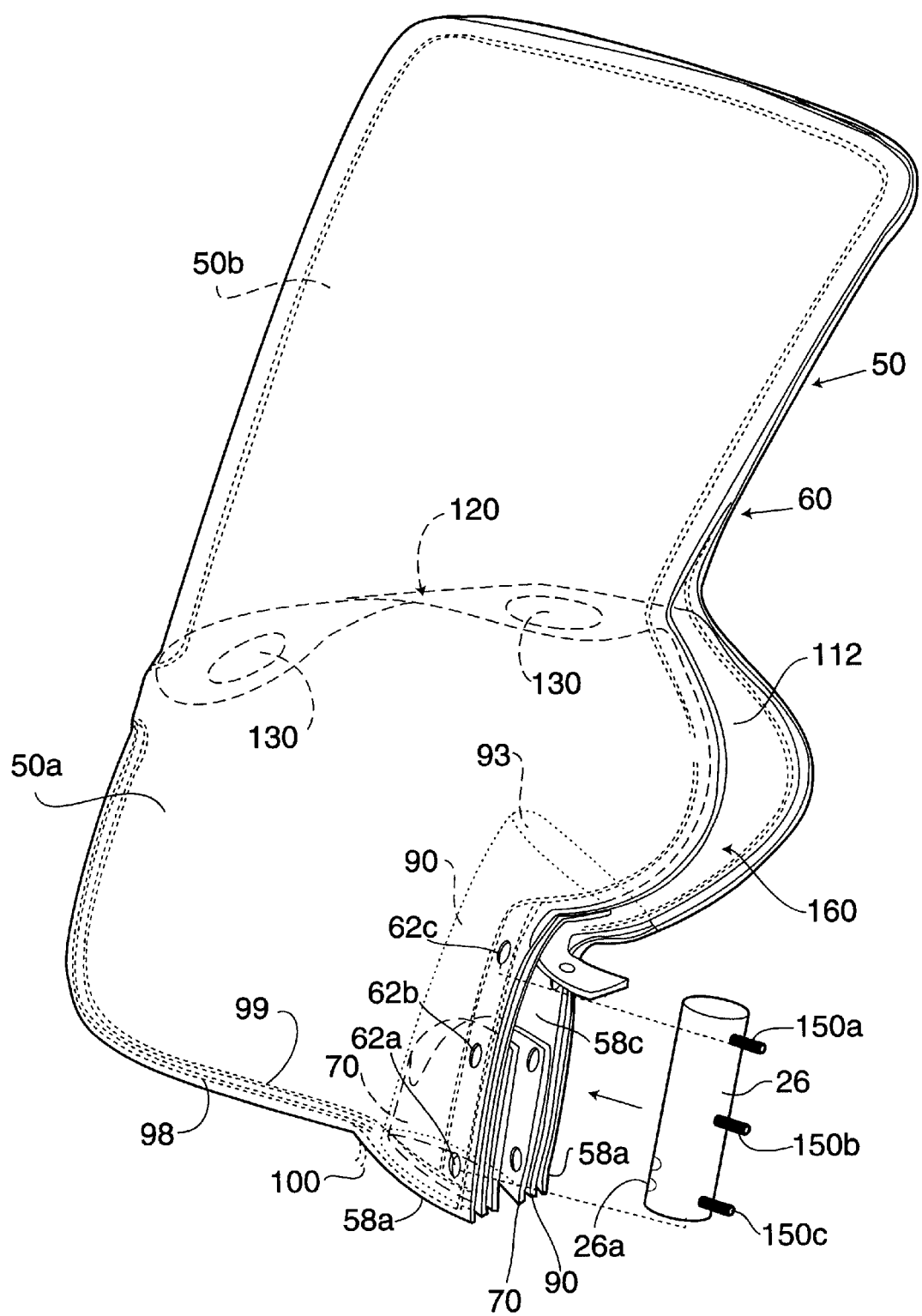
FIG. 4 illustrates an assembled air bag.

As can be seen from FIG. 4, panels 52a and 52b are sewn together, generally along the bottom 58, side 54, top 56 and the top portion 60a of side 60.

The air bag 50 further includes an optional inner panel 70 which primarily functions as a heat shield to shield an outer or diverter panel 90 from the heated inflation gas. This inner panel includes sides 72a and 72b, a bottom 74 and a top 76. As illustrated in FIG. 3C the top includes a depression or low point generally in the vicinity of 78 formed by two straight edges 76a and 76b. The edges of the top 76 can also be arcuate in shape. The panel 70, along its sides 72a and 72b, includes openings 80a and 80b which are in alignment with openings 62a and b in panels 52a and 52b. The diverter panel or diverter 90 is generally rectangular in shape and includes a plurality of mounting openings 92a–92c aligned with openings in each of the side panels 52a and 52b. The diverter 90 includes sides 94a and 94b, a bottom 96 and top 98. As illustrated in FIG. 9, a diverter 90a is provided with optional flow openings or vents 91a and 91b which permit some of the inflation gas to exit generally horizontally into the thorax chamber 50a rather than exit solely out of the top 93 (see FIG. 4) of the diverter 90. The discrete vents or openings 91a and 91b are not employed in the air bag of FIG. 10. The diverter 90b of FIG. 10 is made from a material having a high permeability which permits the inflation gas to exit through the pores 93 (of the material) of the diverter 90b.

Reference is again briefly made to FIG. 4. As can be seen, a sew seam 99 joins the bottoms 58 of panels 52a and 52b and does not extend across the entire bottom but ends generally at location 100 which defines flap portions 58a and 58b at the bottom 58 which are not joined by the sew seam 99. These flap portions create a pocket 58c in which the inflator 26 is received. It should be appreciated that the sew seam 99 can also extend across the entire bottom in which case the lower portions of the pocket 58c are sewn together.

As can also be seen in FIG. 4, the inner panel 70 is registered relative to diverter panel 90 such that openings 80a and 80b are in alignment with openings 92a and 92b. Thereafter, aligned bottom portions 74 and 96 of inner and diverter panels 70 and 90 are sewn to the portions 58a of the bottom of each panel 52a and 52b.

As can be seen from FIG. 4, the central portion 75 of inner panel 70 forms an open top chute or tube which communicates with a second open top chute or tube formed by diverter panel 90.

As mentioned above, the rear side 60 of each of the panels 52a and 52b includes an extending portion 60c. The portions 60c of panels 52a and 52b are each respectively joined to sides 110a and 110b of a rear separator panel 112 (also shown in FIG. 3F). The sides 110a and 110b of side rear separator panel 112 generally meet at a curved apex 114. The other ends of sides 110a and 110b form a rectangular flap 116 which includes an opening 118. As can be seen in FIG. 4, the panel 112 separates the curved portions 60c of each panel 52a and b, thereby forming a 3-dimensional bubble or pressure accumulator 160 increasing the volume of lower chamber 50a of the air bag 50 in relation to the prior art air bags illustrated in FIGS. 2A and 2B. The air bag 50 as illustrated in FIG. 4 is a two-chambered air bag having a lower or torso chamber 50a and an upper or head chamber 50b. A separator 120 defines the boundaries between the upper and lower chambers 50a and 50b. The separator panel 120 has two portions shown in FIG. 3E. The first portion 122 separates the upper and lower chambers and a second portion 124 which is arranged to be coextensive with the rear panel 112 and reinforces same. More specifically, portion 124 is generally shaped similar to panel 112 and additionally includes an opening 118a. Sides 126a and 126b are generally of the same dimension as sides 110a and 110b of the panel 112. The portion 122 additionally has sides 128a and 128b which define a generally oval shaped portion 122. The portion 122 additionally includes vent holes 130. As can be seen from FIG. 4, the sides 128a and 128b (including a tip portion 128c) are sewn to the panels 52a and 52b thereby separating and defining the upper and lower chambers 50a and 50b of the air bag 50. The lower lobe or portion 124 of panel 120 is positioned behind panel 112 wherein the sides 110a and 110b of panel 112 and sides 126a and 126b of portion 124 (of panel 120) are sewn to the respective side portion 60c of each of the panels 52a and 52b.

Figure 5:
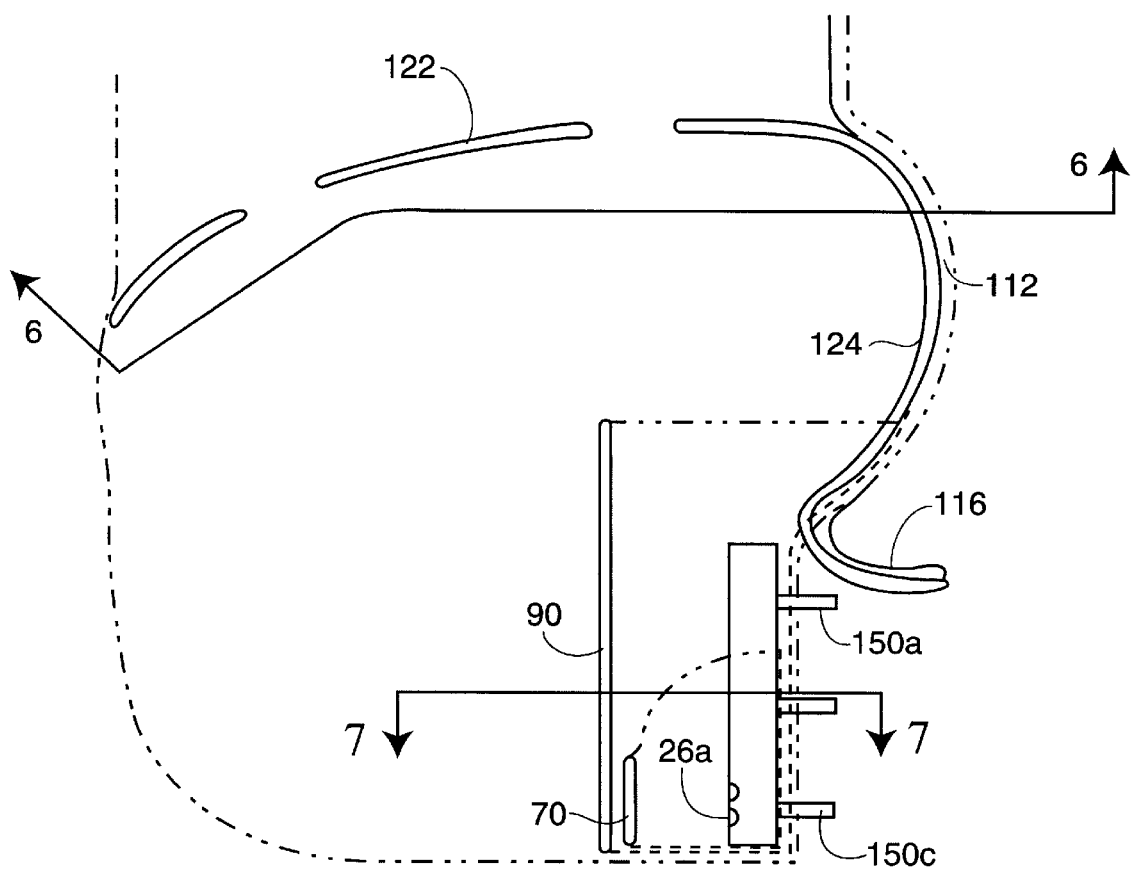
FIG. 5 shows a cross-sectional view of a side impact system.
Figure 6:
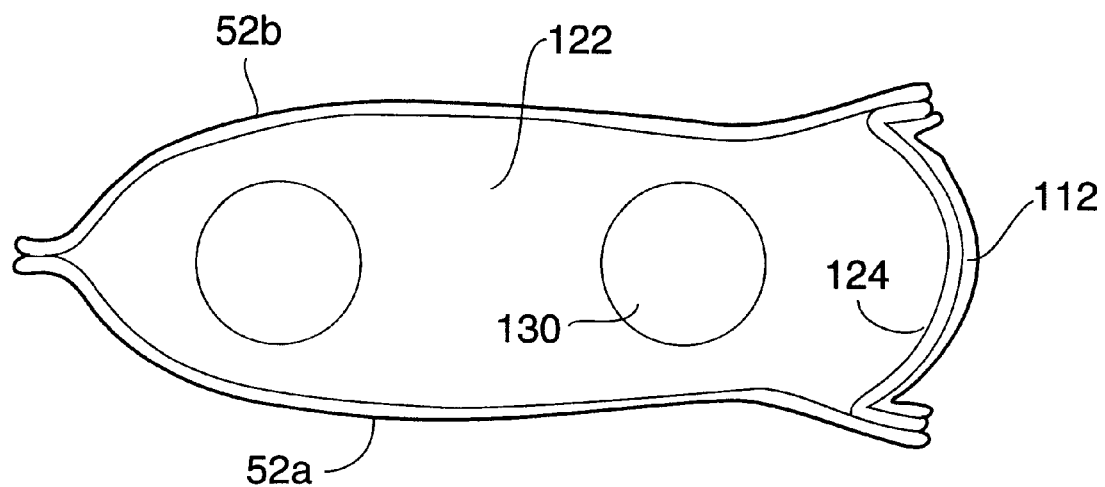
FIG. 6 shows another cross-sectional view.
Figure 7:
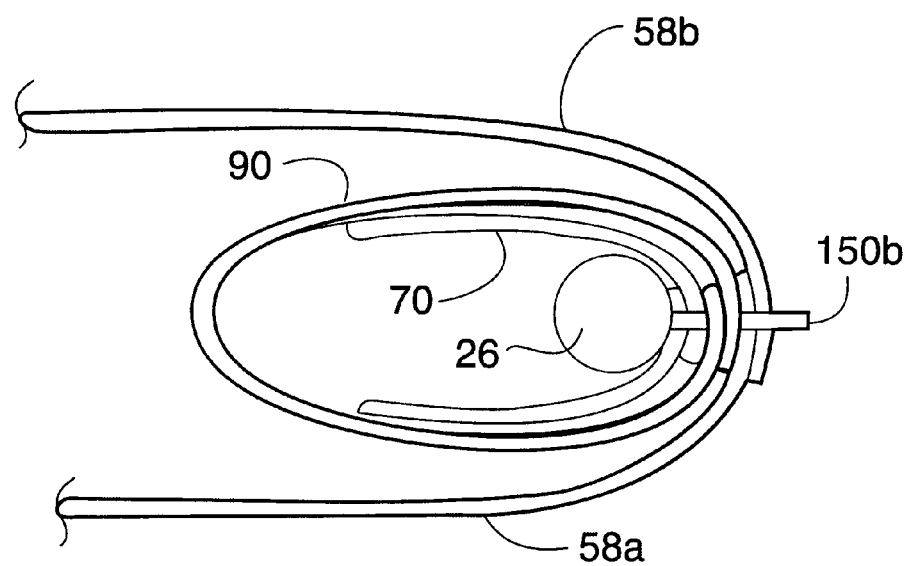
FIG. 7 shows a further cross-section view.

Further details of the construction of the air bag can be seen in FIGS. 5–7 which illustrate various cross sectional views of the air bag 50.

As can be seen in FIG. 5, the inflator 26 includes a plurality (three) of mounting studs 150a–150c (also shown in FIG. 4). The inflator 26 is positioned in the pocket 58c formed by panels 70 and 90 and lower portion 50a and 50b of the side panel 50a and 50b. The registered portions of panels 112 and 120, which include the openings 118 and 118a respectively, are inserted over one of the studs such as mounting stud 150a. Thereafter, the corners of the side panels (having the openings 62a–62c) are moved such that the studs 150a–c are received through the openings 62a–c (as well as openings in the panels 70 and 90) thereby folding this lower portion of each panel about the inflator 26. The exit ports 26a are positioned in the lower extreme of the diverter 90. In some applications the mounting studs 150a–c cannot be directly secured to the inflator 26. This may be the case in a hybrid inflator (which uses a thin pressure vessel). In this case the inflator is placed within a hollow sleeve or manifold (not shown) in a known manner. The studs 150a–c will extend out from the manifold. The manifold will also include one or more flow ports aligned to the exit ports of the inflator.

The operation of the bag 50 and inflator 26 is as follows. Upon activation of the inflator 26, inflation gas impacts the panels 70 and 90 and is channeled upwardly through the open top 93 of the tube (also formed by the panels 70 and 90) directly into bubble portion 160 of the lower chamber 60a. The open top is preferably positioned slightly below the separator 120. The inflation gas flow creates a temporary, high-pressure gradient in the lower chamber 50a in the vicinity of the bubble 160 in relation to other portions of the lower chamber 50a. The inflation gas thereafter migrates to the lower and front portion of the lower chamber 50a, thereby more gently forcing the forward edge 46 of air bag 50 outwardly toward the occupant 30. As the lower chamber 50a is filling, a portion of the inflation gas enters the upper chamber 50b through the vent openings 130. Further, during an accident, experience has shown that the occupant will typically load the lower chamber 50a of the air bag prior to loading the head or upper chamber 50b. This loading additionally forces gas resident ir the lower chamber upwardly through the vent holes 130 to more completely fill the upper chamber 50b to cushion the occupant's head and upper portions of the occupant's torso relative to the adjacent side of the vehicle.

Figure 8:
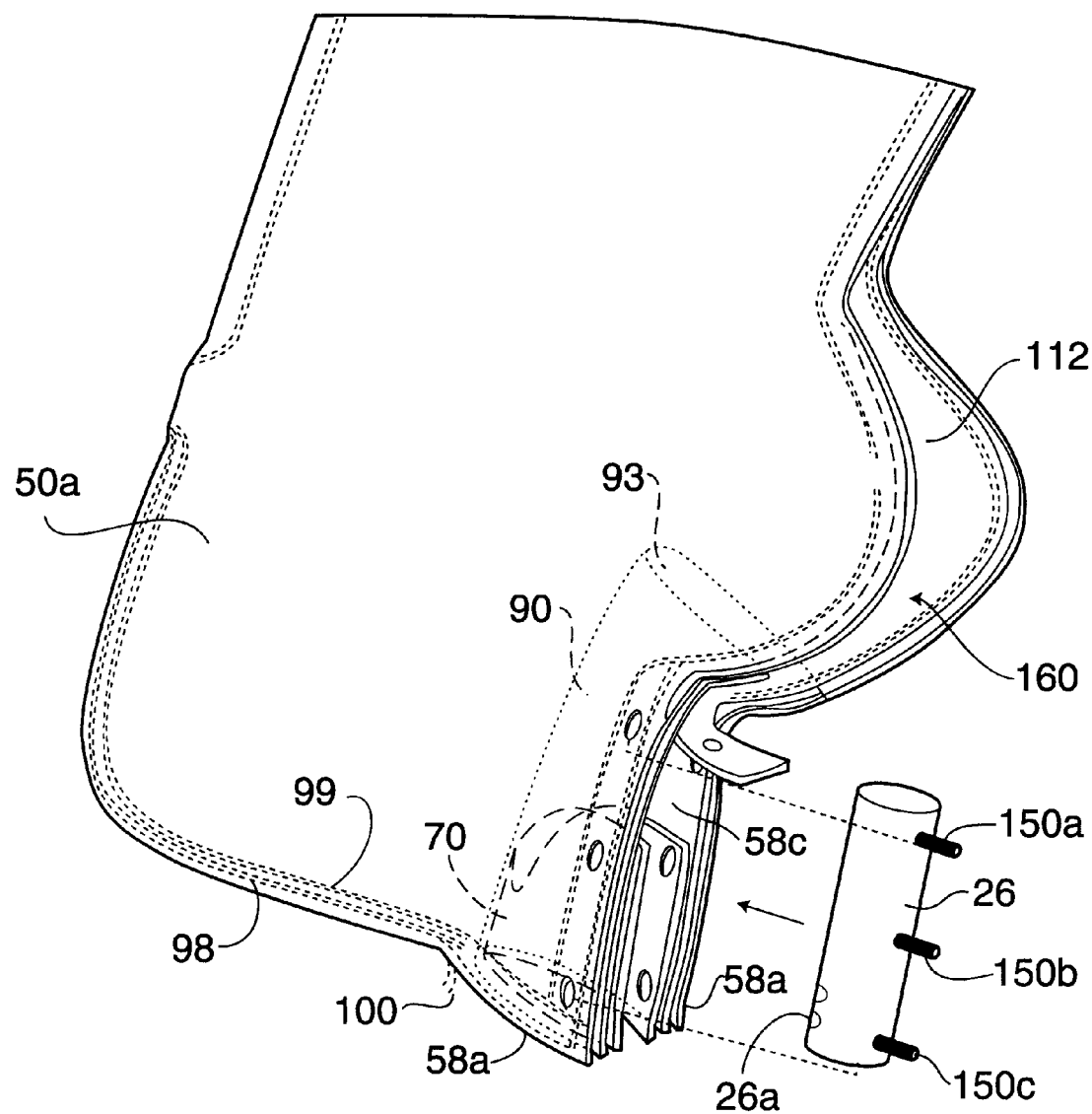
FIG. 8 illustrates an alternate embodiment of the invention.

Reference is briefly made to FIG. 8 which shows an alternative embodiment of the invention. The air bag 50' shown does not include an upper chamber such as 50b or portion 122 of panel 120. This bag 50' includes the bubble 160 and panel 112.

FIG. 9 shows an alternate diverter 90a having additional vents openings 91a and 91b. Upon activation of the inflator 26, inflation gas is produced. This diverter 90a, as is the case with diverter 90, reduces the gas thrust in the occupant's direction by redirecting the gas flow path upwardly which in turn slows down the speed at which the deploying air bag approaches the occupant. The vents 91a and 91b permit a small portion of the inflation gas to exit the diverter in a general horizontal direction toward the occupant which assists in positioning the bag at the side of the occupant. The diverter panel 90b shown in FIG. 10 eliminates the discrete vent openings 91a and 91b of FIG. 9. The diverter 90b is formed by a panel of highly permeable material (such as 440–1000 denier woven, nylon air bag material) which is sewn at its top 90c to the side panels 52a and 52b generally forming a sack. As can be appreciated some of the inflation gas flows upwardly as in the case of diverter 90 and some of the inflation gas flows horizontally as in the case of diverter 90b.

Figure 12A:
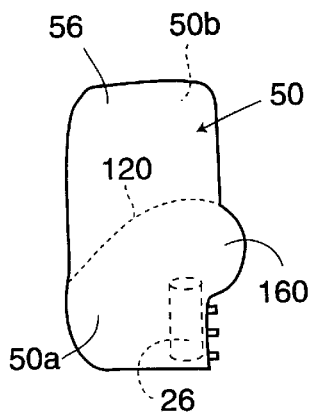
FIGS. 12A–12I illustrate various stages in the folding of an air bag cushion.
Figure 12B:
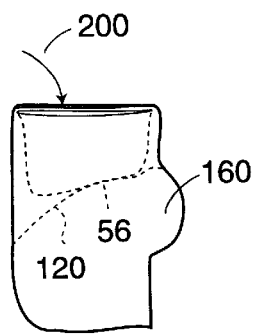
Figure 12C:
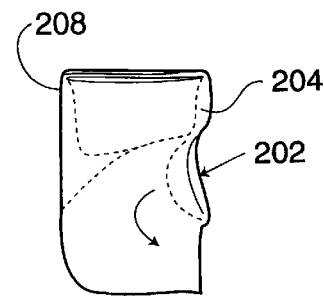
Figure 12D:
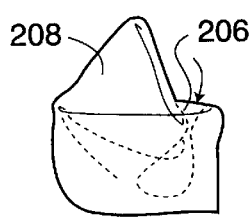
Figure 12E:
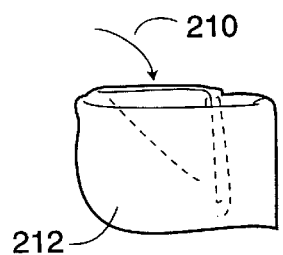
Figure 12F:
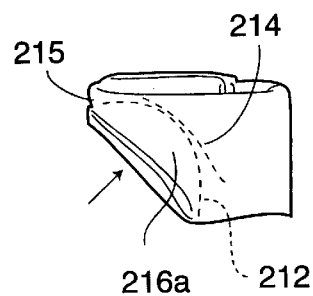
Figure 12G:
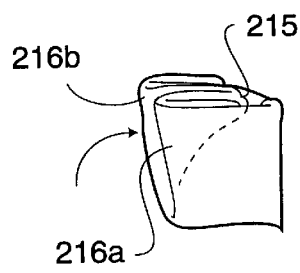
Figure 12H:
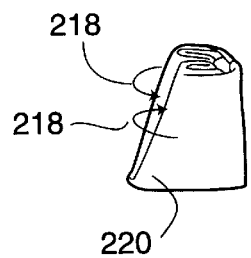
Figure 12I:
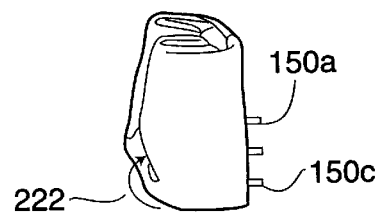

Reference is briefly made to FIGS. 12A–12I which illustrate the sequence used in folding a generally rectangularly shaped air bag 50 (50' or 50") of the type previously discussed. In FIG. 12A the two panels 50a and 50b are laid flat upon a folding table with the inflator 26 positioned therein and the studs 150a–c extending outwardly. If the air bag 50 includes an extending, arcuately shaped bubble portion 160, this portion is similarly laid flat. In FIG. 12B, the top 56 of each of the sewn-together panels 50a and 50b, is pushed inwardly inside the remaining upper portions of the panels 50a and 50b. The top of the panels is pushed inwardly until stopped by the separator panel 120. Arrow 200 of FIG. 12B indicates the motion of the top being pushed inwardly. If the air bag 50 includes an extending bubble portion 160, that bubble portion is similarly moved inwardly as shown by arrow 202 in FIG. 12C. Thereafter, an upper, rearward portion 204 of the top of the tucked-in upper chamber 50b is moved downwardly into a void 206 formed between the panels 52a and 52b forming the lower chamber 50a. This rearward portion of the tucked upper chamber 204 is moved downwardly until the material forming the air bag reaches the bottom of the lower chamber 50a (the separator panel 120 is also moved to the bottom of the lower chamber). At this point in the folding process a portion designated as 208 of the tucked upper chamber 204 (previously the upper left corner of FIG. 12C) is positioned approximately at a 45 degree angle. This condition is shown in FIG. 12D. The remaining untucked portion of the upper chamber previously designated as 208 is moved vertically downwardly until this portion 208 is level with the folded-over material of the lower chamber used to form the pocket 206. The downward motion is shown by arrow 210 as illustrated in FIG. 12E. As can be appreciated the steps shown in FIGS. 12D and 12E can be performed in one operation. The lower outboard corner 212 of the lower chamber is pushed inwardly generally at a 45-degree angle toward the inflator. The corner 212 of the air bag is pushed inwardly at the above-mentioned 45-degree angle until it meets a portion of the previously tucked-in material 214 originating from the previous folds. The top left corner 215 is separated into to wings 216a and 216b as the corner 215 is pushed inwardly. These two wings 216a and 216b are shown in FIG. 12G. As a result of this last folding step the air bag is in a generally square configuration. The wings 216a and 216b are symmetrically folded or rolled inwardly (see arrows 218) so that they reside approximately 30 degrees from the vertical as shown in FIG. 12H. The lower outboard corner 220 (see FIG. 12H) is tucked inwardly (see FIG. 12I) as designated by arrow 222, forming the final folded configuration of the air bag.

Figure 13C:
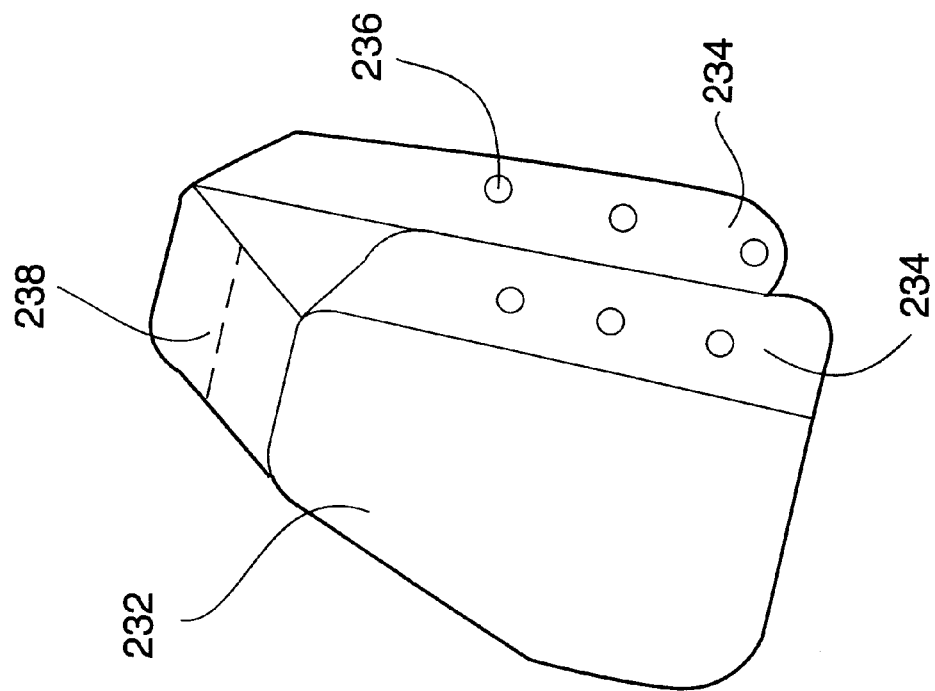
FIG. 13C illustrates an isometric view of the container.
Figure 13B:
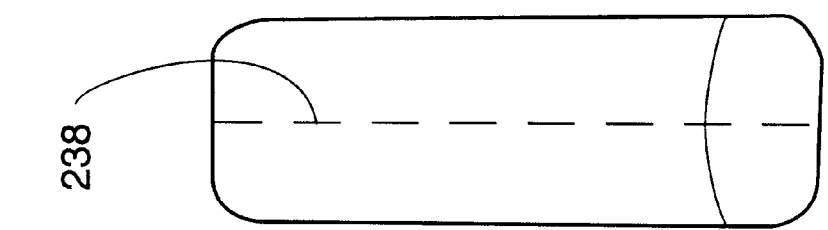
FIG. 13B illustrates an end plan view of the container.
Figure 13A:
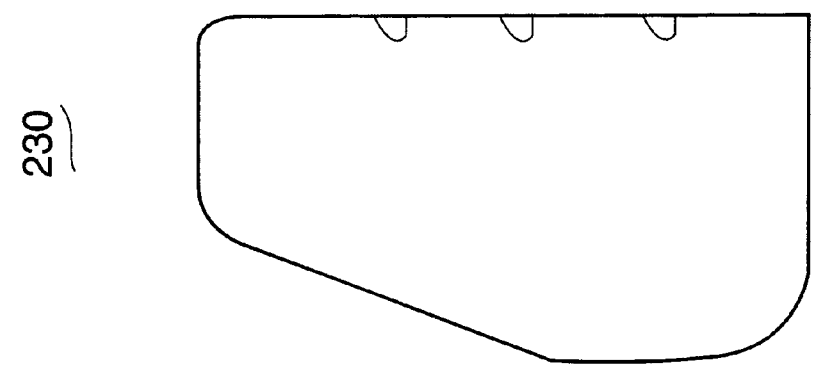
FIG. 13A illustrates a side plan view of an air bag container.

The folded air bag may be held in place by enclosing it within a plastic container or housing 230 shown in FIGS. 13A–13C. The container 230 includes a hollow body 232 having a shape approximately that of the folded air bag shown in FIG. 12I. Extending from this body 232 is a plurality of flaps 234. Each of the flaps includes a like plurality of openings 236. A forward edge of the body includes a line of perforations 238. The folded air bag is inserted within the body 232 and the flaps 234 are fitted about the mounting studs 150a–150c of the inflator 26. A plurality of fasteners, such as threaded nuts, can be secured upon each of the various mounting studs 150a–d, thereby enclosing the air bag within the cover. Upon inflation of the air bag, the air bag causes the seam 238 to break apart.

Many changes and modifications in the above-described embodiment of the invention can, of course, be carried out without departing from the scope thereof. Accordingly, that scope is intended to be limited only by the scope of the appended claims.

What is claimed is:

1. An air bag assembly comprising:
    a side impact air bag (50), which when inflated is adapted to be positioned between an occupant to be protected and a side of a vehicle, having an inflatable first chamber (50a) formed of two joined together first (52a) and second (52b) panels of material, the first chamber including a forward part (26) with a first side and an opposite rear part (60) with a second side;
    an inflator (26) for generating inflation gas to inflate the air bag, the inflator including exit ports (26a) which channel the inflation gas into the rear part of the first chamber in a determinable direction, the inflator positioned adjacent the second side;
    the air bag further including a flow diverter (70, 90) positioned to receive inflation gas and to divert at least a significant portion of the inflation gas to flow generally perpendicular to the determinable direction, the flow diverter including a side wall spaced from the inflator, the side wall including an open top at one end of the side wall and a bottom at an opposite end of the side wall, the open top positioned adjacent the second side and wherein the inflation gas flows through the open top and wherein the bottom is closed.

2. The air bag assembly as defined in claim 1 including a rear separator panel (112) to separate the first and second panels in a small region in the vicinity of the rear part of the first chamber and which forms part of a rear face of the rear of the first chamber.

3. The air assembly as defined in claim 2 wherein the flow diverter comprises a flexible panel of material having an open top.

4. The air bag assembly as defined in claim 3 wherein the flow diverter comprises at least one vent opening in a side wall thereof.

5. The air bag assembly as defined in claim 4 wherein the vent openings of the flow diverter are formed by pores on a permeable material.

6. The air bag assembly as defined in claim 1 including a second chamber (50*b*) and flow means between the first and second chambers for permitting inflation gas to migrate from the first chamber to the second chamber.

7. An air bag assembly comprising:
a side impact air bag (50), which when inflated is adapted to be positioned between an occupant to be protected and a side of a vehicle, having an inflatable first chamber (50*a*) formed of two joined together first (52*a*) and second (52*b*) panels of material, the first chamber including a forward part (26) with a first side and an opposite rear part (60) with a second side;
an inflator (26) for generating inflation gas to inflate the air bag, the inflator including exit ports (26*a*) which channel the inflation gas into the rear part of the first chamber in a determinable direction, the inflator positioned adjacent the second side;
the air bag further including a flow diverter (70, 90) positioned to receive inflation gas and to divert at least a significant portion of the inflation gas to flow generally perpendicular to the determinable direction, the flow diverter including a side wall spaced from the inflator, the side wall including an open top, the open top positioned adjacent the second side and wherein the inflation gas flows through the open top;
including a rear separator panel (112) to separate the first and second panels in a small region in the vicinity of the rear part of the first chamber;
wherein a rear edge of each of the first and second panels includes an extending arcuate portion and wherein the rear separator panel separates the first and second panels apart along the arcuate portion of the first and second panels.

8. A side impact air bag assembly for side impact protection system comprising:
an air bag (50), which when inflated is adapted to be positioned between an occupant to be protected and a side of a vehicle, having an inflatable first chamber (50*a*) formed of two joined-together first (52*a*) and second (52*b*) panels of material, the first chamber including a forward part (26) and an opposite rear part; the spacing between the first card second panels in the vicinity of the rear part being larger than the spacing between other portions of the first and second panels to define a localized wider, rearwardly extending, bulbous portion of the air bag which acts as a pressure accumulator to initially absorb the influx of pressure caused by the inflation gas to thereby cause the forward edge of the air bag to be propelled forward more slowly than if the air bag did not include the accumulator;
an inflator (26) for generating inflation gas to inflate the air bag;
a flow diverter (70, 90) having an open top and positioned to receive inflation gas and to divert same to flow in a vertical direction into the wider portion of the air bag.

9. The air bag as defined in claim 8 wherein the air bag further includes an inflatable second chamber (50*b*) in fluid communication with the first chamber.

10. The air bag as defined in claim 9 wherein the flow diverter comprises an open top flexible tube, wherein the top (93) of the tube is proximate a lower portion of the accumulator.

11. The air bag as defined in claim 10 wherein the first and second chambers are separated by a perforated separator panel and wherein the separator panel includes an extending portion separating the first and second panels in the vicinity of the rear part of the air bag.

12. An air bag assembly comprising:
a side impact air bag (50), which when inflated is adapted to be positioned between an occupant to be protected and a side of a vehicle, having an inflatable first chamber (50*a*) formed of two joined together first (52*a*) and second (52*b*) panels of material, the first chamber including a forward part (26) with a first side and an opposite rear part (60) with a second side;
an inflator (26) for generating inflation gas to inflate the air bag, the inflator including exit ports (26*a*) which channel the inflation gas into the rear part of the first chamber in a determinable direction, the inflator positioned adjacent the second side;
the air bag further including a flow diverter (70, 90) positioned to receive inflation gas and to divert at least a significant portion of the inflation gas to flow generally perpendicular to the determinable direction, the flow diverter including a side wall spaced from the inflator, the side wall including an open top, the open top positioned adjacent the second side and wherein the inflation gas flows through the open top;
wherein the air bag further includes an inflatable, bulbous portion located in the rear part of the first chamber, wherein the bulbous portion is located opposite and above the diverter.

13. An air bag assembly comprising:
a multi-sided, inflatable air bag;
an inflator installed within the air bag, proximate one corner thereof;
a tubular deflector, located proximate the one corner of the air bag, the corner formed by two adjacent sides, the deflector spaced downstream of the inflator, the deflector having an open top oriented to re-direct inflation gases to flow generally upwardly after leaving the inflator and being diverted by the deflector, the deflector at an end opposite the open top being sewn into the air bag to restrict inflation gas from flowing out of this sewn end.

14. The air bag assembly as defined in claim 13 wherein the flow deflector comprises a flexible panel of material secured within the air bag and having an open top.

15. The air bag assembly as defined in claim 13 wherein the flow deflector comprises at least one vent opening in a side wall thereof.

16. The air bag assembly as defined in claim 15 wherein the vent openings of the flow deflector are formed by pores on a permeable material.

17. The air bag assembly as defined in claim 13 including a separating means for separating the air bag into a first or upper and a second or lower chamber and wherein the separating means includes flow means between the first and second chambers for permitting inflation gas to migrate from the first chamber to the second chamber.

18. The assembly as defined in claim 13 wherein the air bag further includes an inflatable, bulbous portion located in a rear part of a first chamber, wherein the bulbous portion is located opposite and above the deflector.

19. The assembly as defined in claim 18 wherein the bulbous portion is formed by arcuate extensions formed in opposing side panels of the air bag and by a rear separator panel inserted between the arcuate extensions.

20. The assembly as defined in claim 13 including first and second side panels that are, at least partially, joined together to form the inflatable air bag and where opposing portions of the first and second side panels, along respective sides of each such panel, are spaced apart by a rear separator panel to locally increase the spacing between the side panels when the air bag is inflated.

* * * * *